(12) United States Patent
Adnan et al.

(10) Patent No.: US 7,420,475 B2
(45) Date of Patent: Sep. 2, 2008

(54) WELL SITE COMMUNICATION SYSTEM

(75) Inventors: Sarmad Adnan, Sugar Land, TX (US); Michael G. Gay, Dickinson, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 246 days.

(21) Appl. No.: 10/926,522

(22) Filed: Aug. 26, 2004

(65) Prior Publication Data

US 2006/0044156 A1 Mar. 2, 2006

(51) Int. Cl.
*G01V 3/00* (2006.01)

(52) U.S. Cl. .............. 340/853.3; 340/854.7; 340/854.9; 166/336

(58) Field of Classification Search .............. 340/854.7, 340/853.3, 854.9; 166/254.2, 336, 352
See application file for complete search history.

(56) References Cited

U.S. PATENT DOCUMENTS

| | | | |
|---|---|---|---|
| 4,547,774 A * | 10/1985 | Gould .................. 340/854.7 |
| 5,706,896 A * | 1/1998 | Tubel et al. ............. 166/313 |
| 6,253,842 B1 * | 7/2001 | Connell et al. ............. 166/66 |
| 6,469,636 B1 | 10/2002 | Baird et al. |
| 6,519,568 B1 * | 2/2003 | Harvey et al. .................. 705/1 |
| 6,531,694 B2 | 3/2003 | Tubel et al. ............ 250/227.14 |
| 6,768,700 B2 | 7/2004 | Veneruso ..................... 367/81 |
| 6,873,267 B1 * | 3/2005 | Tubel et al. ............. 340/853.3 |
| 2002/0163441 A1 | 11/2002 | Hill et al. |
| 2002/0171560 A1 | 11/2002 | Ciglenec et al. |
| 2003/0010500 A1 * | 1/2003 | Smith ......................... 166/336 |
| 2003/0098799 A1 | 5/2003 | Zimmerman ............. 340/854.6 |
| 2003/0131990 A1 | 7/2003 | Tubel et al. |
| 2004/0105342 A1 | 6/2004 | Gardner ....................... 367/25 |
| 2004/0108118 A1 | 6/2004 | Williams .................... 166/375 |
| 2005/0236161 A1 * | 10/2005 | Gay et al. .................. 166/380 |
| 2005/0263281 A1 * | 12/2005 | Lovell et al. ............. 166/255.1 |
| 2006/0157239 A1 * | 7/2006 | Ramos et al. ............. 166/254.2 |

* cited by examiner

*Primary Examiner*—Timothy Edwards, Jr.
(74) *Attorney, Agent, or Firm*—Michael Flynn; David Cate; Robin Nava (57) ABSTRACT

A well site communication system for providing communication from downhole devices to surface systems and from surface system to downhole systems, and methods of using are presented. The communication system is particularly applicable for use with spooled conveyances disposed on a reel. The communication system comprises a communication assembly that may be provided in the reel. The communication assembly may be used to process data or information received from devices disposed in a wellbore and the communication assembly may communicate wirelessly with surface or downhole devices.

42 Claims, 6 Drawing Sheets

WELL SITE COMMUNICATION SYSTEM

BACKGROUND OF THE INVENTION

1. Field of the Invention

The present invention relates generally to methods and apparatus for communication for well site operations. It is particularly useful for well site communications in which a reeled or spooled conveyance is used.

2. Description of the Related Art

On many occasions in well site operations, and for a variety of purposes it is desired to convey tools, sensors, or other apparatuses into a wellbore. Reeled or spooled conveyances, such as coiled tubing, wireline, and slickline commonly are used. Coiled tubing is useful particularly for conveying such devices in highly deviated or horizontal wells. While spooled conveyances offer several operational advantages in handling, transport, and deployment, the transition between a stationary surface system and the rotating reeled or spooled conveyances can be difficult. Typically collectors disposed on the reel or spool plus associated wiring are used to accommodate this transition to connect the reeled conveyance to surface systems. This wiring can be physically cumbersome in a work location. In addition, collectors may become unreliable or break.

Figure 1:
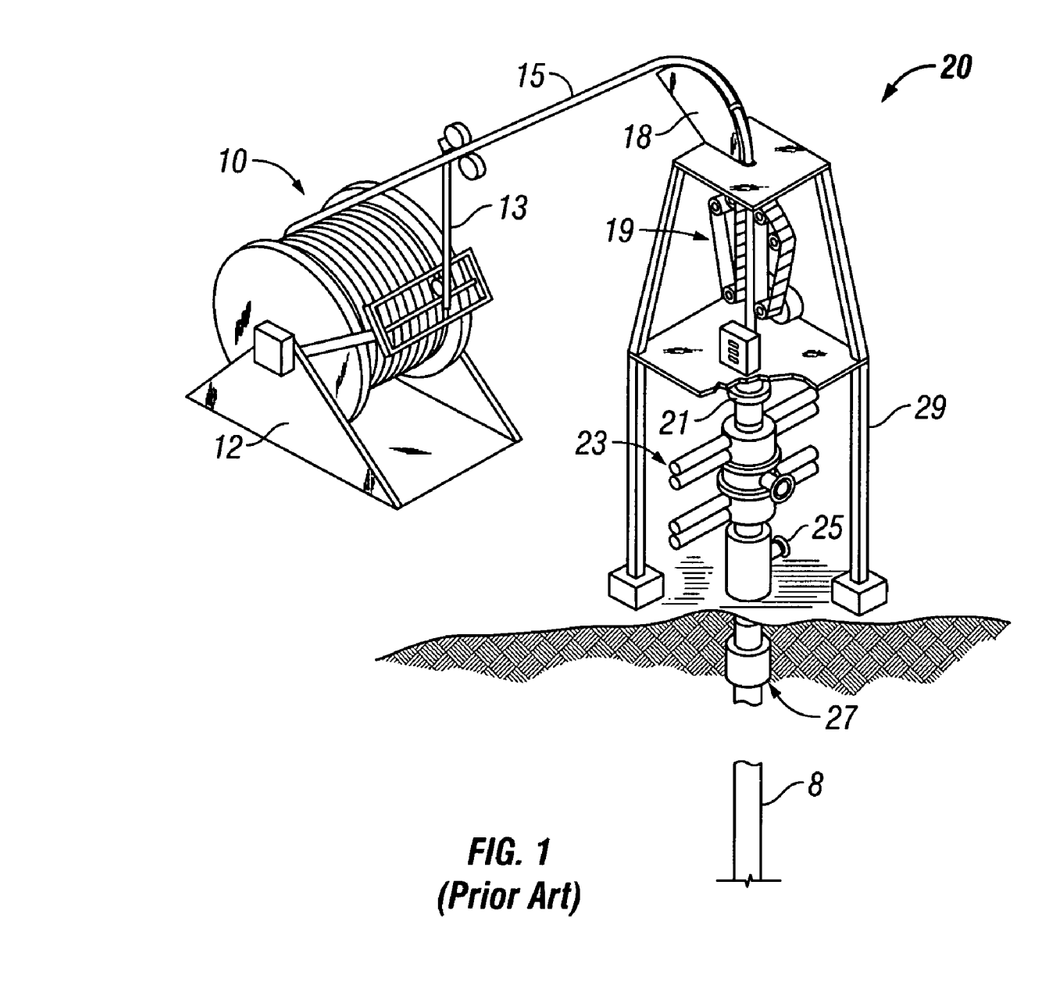
FIG. 1 shows a typical configuration for coiled tubing surface handling equipment.

A typical configuration for the surface handling equipment for coiled tubing is shown generally in FIG. 1. The surface handling equipment includes an injector system 20 on supports 29 and coiled tubing reel assembly 10 on reel stand 12, flat, trailer, truck or other such device. The tubing is deployed into or pulled out of the well using an injector head 19. The equipment further includes a levelwind mechanism 13 for guiding coiled tubing 15 on and off the reel 10. The coiled tubing 15 passes over tubing guide arch 18 which provides a bending radius for moving the tubing into a vertical orientation for injection through wellhead devices into the wellbore. The tubing passes from tubing guide arch 18 into the injector head 19 which grippingly engages the tubing and pushes it into the well. A stripper assembly 21 under the injector maintains a dynamic and static seal around the tubing to hold well pressure within the well as the tubing passes into the wellhead devices which are under well pressure. The coiled tubing then moves through a blowout preventor (BOP) stack 23, a flow tee 25 and wellhead master valve or tree valve 27. A quick connect fitting is placed between the BOP and the stripper above.

Figure 2:
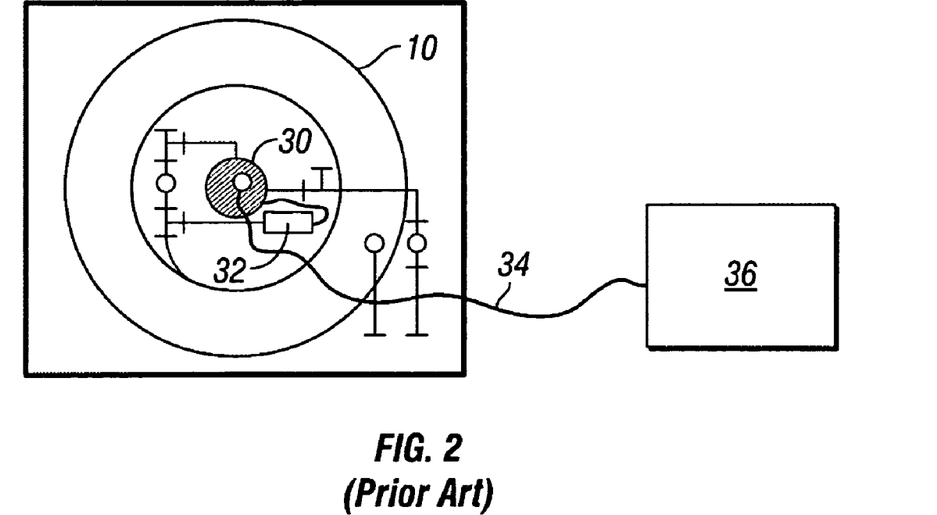
FIG. 2 shows a prior art coiled tubing to surface equipment configuration using a collector.

When coiled tubing 15 disposed on a coiled tubing reel 10 is deployed into or retrieved from a borehole 8, the coiled tubing reel 10 rotates. In typical communications in coiled tubing operations as shown in FIG. 2, a collector 30 is fitted to the reel 10 and used to connect and provide communication between the downhole system and the surface data acquisition equipment 36. Commonly the collector 30 has a slip ring configuration that maintains the power and signal connection regardless of reel orientation. The communication element may be truncated in a feed-through pressure bulkhead 32 with wired telemetry signal path 34 continuing through the reel axle and out the collector ring. In coiled tubing operations, the signal path 34 commonly exits through the reel axle on the opposite side from the fluid swivel. From the reel or spool, the signal path 34 is connected to a surface data acquisition system 36. In this way, data signals may be passed uphole to or control signals may be passed downhole from the borehole communication element through the collector ring on the reel assembly to the surface data acquisition components. This prior art method of establishing communication in coiled tubing operations requires a physical connection, such as wiring, for the signal path. This physical connection can be disadvantageous as it restricts the possible spatial configuration of components, limits placement of equipment, and adds a wire line to be avoided by personnel during well site operations. In addition the use of a collector 30 adds expense to the system and requires maintenance.

A typical coiled tubing communication system comprises a surface acquisition system linked via a downhole telemetry system to a downhole acquisition system in which information is sensed downhole. Various methods of downhole telemetry to link downhole acquisition systems to surface acquisition systems are known and include mud pulsing, mechanically generated signal events, wireline cables, and slickline. Often during wellbore operations it is beneficial to have real-time knowledge of the actual downhole conditions. One method of accomplishing this in coiled tubing operations is to dispose a communication element, such as wireline, in the coiled tubing. Wireline provides the functionality of permitting communication in both uphole (e.g. sensed data from borehole apparatuses) and in downhole (e.g. operational commands) direction. Typically the wireline communication element is linked to a surface acquisition system such as a wireline truck.

While providing wireline in cable may permit real-time transmission of downhole data to the surface, using wireline inside coiled tubing presents some disadvantages. It reduces the cross-sectional area available for fluid flow in the tube. It incurs a large friction against the fluid flow owing to the relatively large diameter of the wireline compared to the fluid flow path within the coiled tubing, as well as the typical multi-stranded nature of the wireline. As a result, large friction and turbulence factors may be introduced. Another difficulty with electrical cables is the weight of the cable; it can increase the system weight by up to 25%, making it difficult to manipulate and install in the field.

A system to communicate information about downhole conditions to the surface and surface information downhole is desirable. In particular, a communication system to sense, control and verify the status of the wellbore operations using reeled or spooled conveyance is desirable. While described in the context of a coiled tubing conveyance system, the present invention is well suited for use with any reeled or spooled conveyance system. Thus, a method and apparatus for well bore communication is needed that is capable of transmitting downhole information to the surface and communicating that data to the surface acquisition system in real time without the disadvantages of using a surface collector.

SUMMARY OF THE INVENTION

The present invention relates to a device and method for wireless communication in wellbores and surface environments. In particular, the present invention provides a method and apparatus for communication in coiled tubing operations without requiring a collector. The invention is suitable for use with wireline, slickline, fiber optic, or other borehole communication systems. The present invention is useful for oilfield service applications where data are transmitted uphole and communicated to a data processing or acquisition system, or where signals, commands, or programming is transmitted downhole to tools, sensors, or other apparatuses. Among other uses, the present invention is particular applicability for telemetry, depth correlation, actuating tools, and guiding borehole tools.

In some embodiments, the present invention provides a well site communication system comprising a wellbore acquisition system, the acquisition system having at least one device disposed in a borehole and a telemetry link between the borehole device and the surface; a surface acquisition system; and a communication assembly in operable communication with the wellbore acquisition system and the surface acquisition system. The communication assembly may communicate wirelessly with either one or both of the wellbore acquisition system and the surface acquisition system.

In some embodiments, the present invention provides a well site communication system comprising a wellbore acquisition system including a communication element and at least one borehole device attached to a spooled conveyance disposed on a reel, the reel being rotatable to spool or unspool the conveyance; a surface acquisition system; and a communication assembly disposed on the reel, the communication assembly being in operable communication with the wellbore acquisition system and the surface acquisition system.

In other embodiments, the present invention is directed to a method of communicating at a well site using a telemetry link to transmit information from at least one device disposed in a wellbore from downhole to the surface; receiving the transmitted information at a communication assembly; and communicating the received information from the communication assembly to a surface acquisition system. In some embodiments, the communicating is performed wirelessly. In some embodiments, the telemetry link is provided via a spooled conveyance disposed on a reel and the communication assembly is disposed on the reel.

The present invention also provides a method of performing wellbore operations comprising deploying a device downhole using a spooled conveyance disposed on a reel; providing a telemetry link between the downhole device and the surface; transmitting information from the downhole device to the surface using the telemetry link; receiving the transmitted information in a communication assembly; and relaying the information from the communication assembly to a surface acquisition system. In some embodiments, the relaying is performed wirelessly.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the claims.

DETAILED DESCRIPTION OF THE INVENTION

The communication system of the present invention comprises a surface acquisition system, a wellbore acquisition system comprising at least one downhole device and a telemetry link, and a communication assembly in operable communication with the downhole acquisition system and the surface acquisition system, wherein the communication assembly communicates wirelessly with at least one of the downhole acquisition system and the surface acquisition system. In some embodiments, the communication assembly is in operable wireless communication with the surface acquisition system. In some embodiments one or both of the surface acquisition system and the downhole acquisition system comprises a fiber optic telemetry link. In some embodiments, the present invention may integrate downhole data or surface information acquired from other sources with data acquired using the wellbore acquisition system. While described in terms of use in coiled tubing operations, the invention is equally applicable to conveyances suitable to be spooled about a reel, such as wireline or slickline, wherein a communication assembly is located inside the reel, spool, or wireline drum and in operable communication with a surface acquisition system and a downhole acquisition system.

For the purpose of the present invention, the term "wireless system" shall mean a system incorporating wireless devices. The term "wireless devices" shall mean devices that can transmit, receive, or both transmit and receive wireless communications without the need for a physical connection (e.g. cable or wire). A wireless system may further include devices for communicating with downhole devices such as gauges, sensors, valves, sampling devices, temperature sensors, pressure sensors, flow-control devices, flow rate measurement devices, oil/water/gas ratio measurement devices, scale detectors, actuators, locks, release mechanisms, equipment sensors (e.g., vibration sensors), sand detection sensors, water detection sensors, data recorders, viscosity sensors, density sensors, bubble point sensors, composition sensors, resistivity array devices and sensors, acoustic devices and sensors, other telemetry devices, near infrared sensors, gamma ray detectors, $H_2S$ detectors, $CO_2$ detectors, downhole memory units, downhole controllers, perforating devices, shape charges, firing heads, locators, and other devices. The system of the present invention also may communicate with surface wireless devices other than a surface acquisition system or downhole acquisition system; examples of such wireless devices include computers, cell phones, personal data assistants (PDAs), pocket personal computers (pocket PCs) or other devices capable of sending or receiving a wireless signal. The present invention is capable of collecting and transmitting data to multiple wireless devices simultaneously while running the job.

Figure 3:
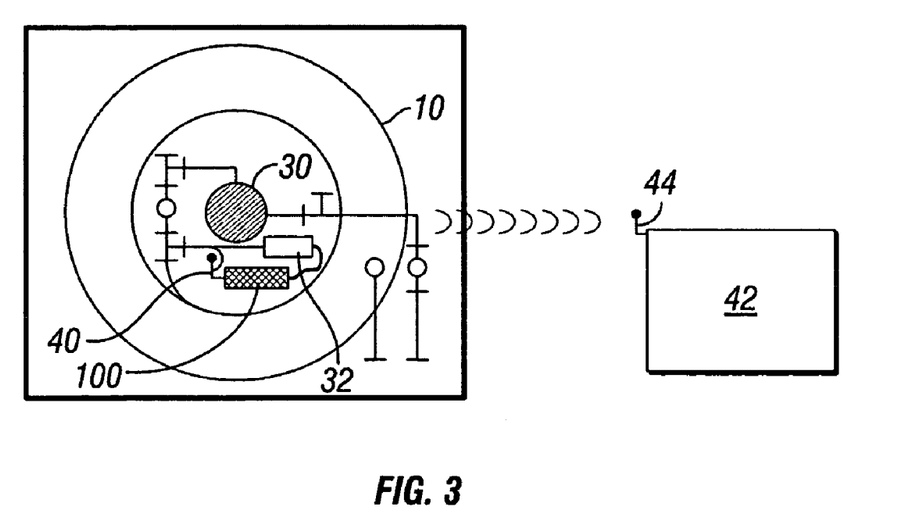
FIG. 3 shows an embodiment of the coiled tubing communication system to surface equipment configuration of the present invention.

FIG. 3 shows one embodiment of the present invention wherein the communication assembly 100 is placed within the coiled tubing reel 10 and transmits data received from the downhole acquisition system to the surface acquisition system via wireless telemetry transmitter 40. In the embodiment shown in FIG. 3, communication assembly 100 is installed on the rotating drum of the coiled tubing reel. Surface acquisition system 42 is provided separately and receives the transmitted signals via wireless telemetry receiver 44. In some instances, surface acquisition system 42 is placed inside a coiled tubing truck or control cab. Data transmitted uphole is received in communication assembly 100, processed if and as desired, and then transmitted wirelessly to surface acquisition system 42. Methods to transmit data wirelessly include but are not limited to cellular modems; wireless serial modems (RS232 and RS485); wireless fidelity IEEE 802.11 (WiFi); BLUETOOTH protocol, or an AM or FM digital transmitter-receiver pair. As way of example and not of limitation, a BLUETOOTH system may be provided that uses a 1 Mb/sec data rate with low energy consumption for battery-powered devices operating in the 2.4 GHz ISM (industrial, scientific, medical) band and provides a range capability in the order of a few hundred meters.

Figure 4:
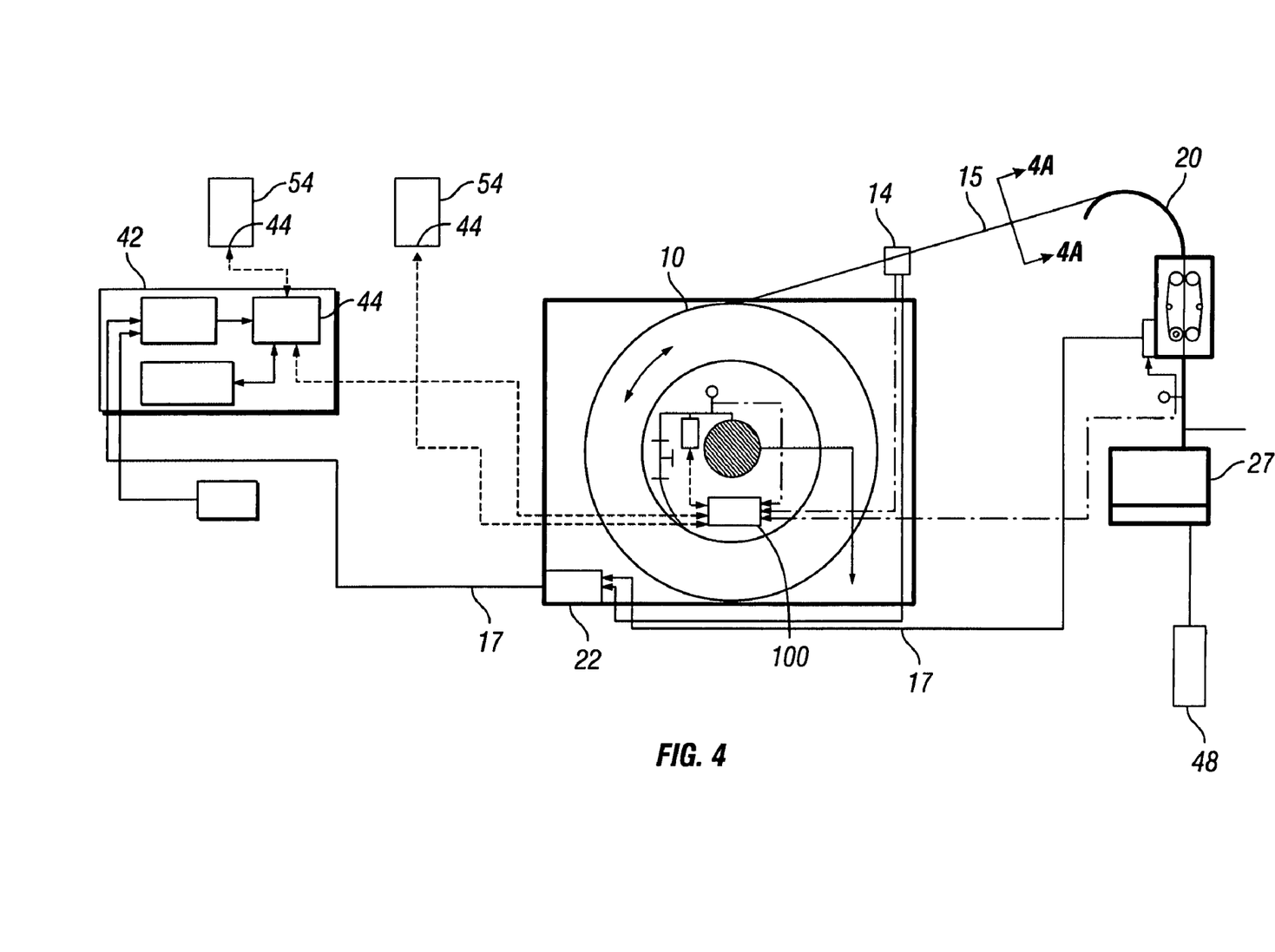
FIG. 4 shows an embodiment of the coiled tubing communication system to surface equipment configuration of the present invention.
Figure 4A:
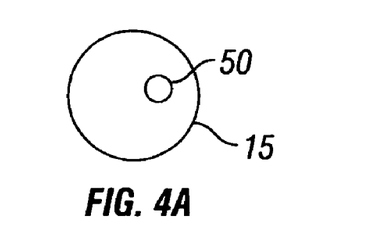
FIG. 4A shows a cross-section of an embodiment of a communication element useful in the present invention.

One embodiment of the present invention is shown on FIG. 4. Communication assembly 100 is shown in FIG. 4 as mounted to the interior diameter of coiled tubing reel 10; in this manner, communication assembly 100 rotates with coiled tubing reel 10. Although the communication assembly 100 is shown mounted to the interior diameter of the coiled tubing reel 10, the present invention is not limited to this configuration. For example, communication assembly 100 may be provided on an axle and rotatably mounted, may be mounted along the reel axle where the communication assembly is permitted to rotate, or may be mounted in a stationary position and a swivel connection used between the communication assembly and the reel. Communication system 100 receives downhole signals via communication element 50. Examples of communication element 50 include but are not limited to wireline, slickline, fiber optics, fiber optic cables, and fiber optics disposed in a protective sheath. In this embodiment, as shown on FIG. 4A, communication element 50 is disposed within the coiled tubing 15 and communication element 15 is deployed into and retrieved from wellbore 8 with coiled tubing 15. In different embodiments, communication element 50 may be deployed within the coiled tubing after the coiled tubing 15 has been placed within the wellbore 8. U.S. patent application Ser. No. 10/872,176, entitled "Method and apparatus for deploying a line in coiled tubing", co-assigned with the present invention and incorporated herein in the entirety, presents methods for placing a communication element in coiled tubing while the coiled tubing in spooled on a reel as well as after the coiled tubing is deployed in a wellbore.

Communication assembly 100 receives data signals collected from downhole tools or sensors, shown generally in FIG. 4 as borehole assembly (BHA) 48, via communication element 50, processes the signals if desired, and transmits the signals via wireless telemetry transmitter 40 to data acquisition system 42. Signal processing may include, among others, filtering the signals, sampling the signals at predetermined intervals, applying a gate to the signals, selectively passing or excluding signals from particular tools or sensors, or selectively passing or excluding signals based on wellbore conditions. The signal processing methods of the present invention can be implemented in hardware or software, or a combination of both. In one embodiment, the functions of a wireless device (for example a BLUETOOTH device), are implemented as one or more integrated circuits using a suitable processing technology, e.g., CMOS, HBT.

Besides transmitting signals to data acquisition system 42, communication assembly 100 may also transmit the signals to other wireless devices 54, shown in FIG. 4 as PDAs. Multiple wireless devices 54 can receive simultaneously via their respective wireless telemetry receivers 44 signals transmitted from communication assembly 100. Wireless telemetry receivers 44 may be provided separately and connected to wireless devices 54 or the receivers may be inherent, pre-existing, or preinstalled in a wireless device such as computer and PDAs. In the present invention, for example, data acquisition system 42 can receive wireless signals from communication assembly 100 at essentially the same time as the field engineer and coiled tubing operator receive the signals on their wireless devices 54. This provides particular advantages for the well site operations where real-time information is useful for a variety of operations systems as well as a variety of persons. Furthermore, data acquisition system 42 can in turn transmit the received signals to offsite locations via methods such as described in co-assigned U.S. Pat. No. 6,519,568, incorporated herein by reference.

Some embodiments of the present invention comprises a wellbore acquisition system wherein a borehole device 48 is conveyed in a wellbore using coiled tubing 15 having a communication element 50 disposed therein to provide a telemetry link between the borehole device 48 and the surface. In some embodiments the borehole device may be attached to the coiled tubing while is it spooled on a coiled tubing reel 10 and may be deployed in the wellbore by unspooling the coiled tubing and retrieved from the wellbore by spooling the coiled tubing. Communication assembly 100 may be disposed on the coiled tubing reel 10 in a manner that permits communication assembly 100 to rotate with coiled tubing reel 10 as it rotates the coiled tubing is spooled and unspooled about the reel 10. In some embodiments the communication element may comprise fiber optics, and in particular embodiments, the communication element may comprise fiber optics disposed in a protective tube or sheath.

In other embodiments, for example when using wireline or slickline, communication element 50 may be used as the conveyance to convey borehole device 48 in a wellbore, the communication element 50 also providing the telemetry link between the borehole device 48 and the surface. In some embodiments the borehole device may be attached to the conveyance while is it spooled on a reel and may be deployed in the wellbore by unspooling the conveyance and retrieved from the wellbore by spooling the conveyance. Communication assembly 100 may be disposed on the reel in a manner that permits communication assembly 100 to rotate with the reel as the conveyance is spooled and unspooled as it is retrieved and deployed into a wellbore. It is anticipated within the scope of the well site communication system of the present invention may be repetitively deployed, used, and retrieved in the same wellbore or singularly or repetitively deployed, used, and retrieved across multiple wellbores. The well communication system of the present invention may, if desired, be used in combination with other communication systems. For example, the well communication system of the present invention may be used for communicating wellbore data in conjunction with other communications such as known commercially available depth measurement systems. Referring to FIG. 4, depth measurement device 14 operates as known to measure the length of coiled tubing 15 when unspooling or spooling communicates that information via wire cable 17 to reel operating system and data acquisition system 42. Similarly, in some instances, it may be desired to provide a conventional surface communication system in addition to the wireless system of the present invention for certain applications. For example, in an existing well with conventional wired communication from the wellhead to a control panel for monitoring pressure, it may be desirable to make use of the existing system to communicate information relating to surface operations to the surface acquisition system while the well communication system of the present invention is used to wirelessly transmit downhole data. In this manner, the well communication system of the present invention may be used strategically for well site operations without requiring reworking and reconfiguration of the entire well site communication system.

Figure 5:
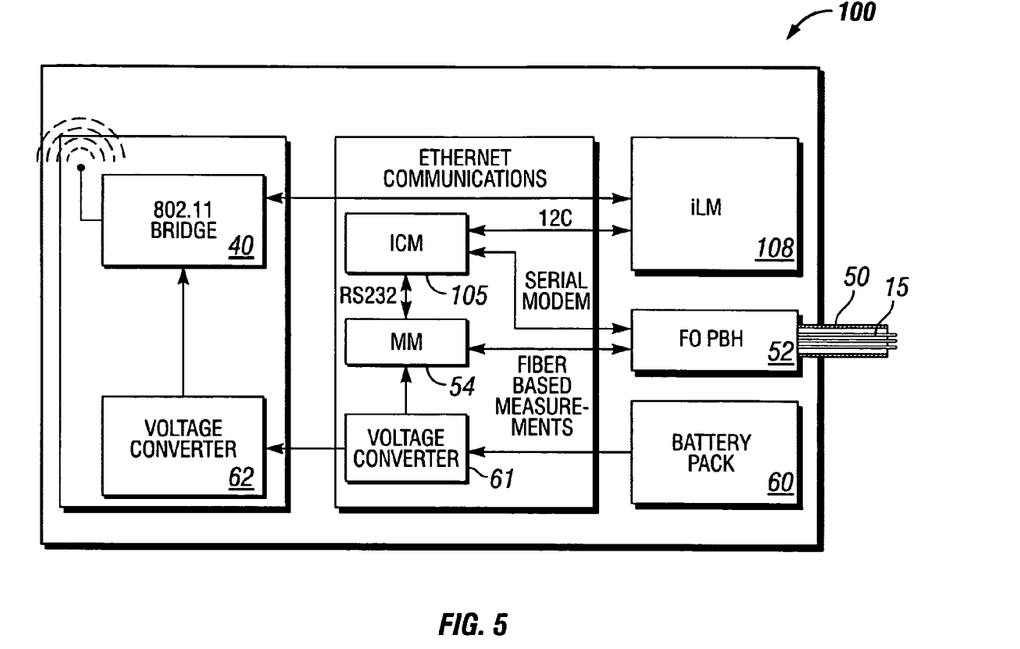
FIG. 5 shows an embodiment of the communication assembly of the present invention.

Turning to FIG. 5, an embodiment of communication assembly 100 is shown. In this embodiment, communication element 50 is shown as optical fibers inside coiled tubing 15. Communication element 50 feeds through pressure bulkhead 52 to measurement module 54. In the case of data being transmitted via optical fiber, measurement module 54 converts the optical signal to a digital or analog signal. The digital or analog signal is then transmitted over fiber optics or wire to communication module 105. Other measurements may be transmitted directly to communication module 105. For example, as shown in FIG. 5, a casing collar locator may provide depth data directly to the communication module 105 via serial modem or other communication means. Data may then be transmitted from communication module 105 to an interface module 108 to be further transmitted to wireless telemetry transmitter and receiver 40 or data may be transmitted directly from the communication module 105 to wireless telemetry transmitter 40. Interface module 108 may communicate to the wireless transmitter and receiver 40, shown in FIG. 5 as a 802.11 bridge, by a variety of methods such as wire, fiber optics, Ethernet connection, local area network (LAN) or wide area network (WAN). Communication assembly 100 is operable to provide wireless communication (for example of sensed data) from the wellbore acquisition system to the surface acquisition system and to provide wireless communication (for example of control commands) from the surface acquisition system to the wellbore acquisition system. Wireless transmitter and receiver 40 is functional to receive signals from interface module 108 and transmit the signals wirelessly to the surface acquisition system 42 and wireless devices 54 or to receive wireless signals transmitted from the surface acquisition system 42 and wireless devices 54 to the interface module 108 or communication module 105 for transmission to the wellbore acquisition system.

Power supply for communication module 100 is shown as a battery 60 and voltage converters 61, 62 are provided if required. The power source, however, is not limited to a battery but may by any power source suitable for use, such as a fuel cell, a generator, an alternator, or a power line extending to surface source of power. In some embodiments, a power generation device, such as a generator, alternator, or an optical light source, may be disposed on or in the coiled tubing reel, thereby eliminating the need for a battery or other power source. In some embodiments, such as when the power generation device is a generator or alternator, power may be generated by the hub rotation.

When it is desired for communication assembly 100 to process signals, such processing may be performed in the measurement module 54, interface module 108, or communication module 105. Selected processing may be performed in one or more of the modules. For example, analog data received via communication element 50 may be processed in measurement module 54 while digital data received via communication element 50 may be processed in the interface module 108. It is preferred to perform signal processing, such as applying a DSP algorithm, using the interface module 108.

Communication assembly 100 preferably may be disposed on reel 10 such that receipt and processing of data or information from the wellbore acquisition system is performed separately from the surface acquisition system. In prior art well site communication system, the surface acquisition system functions to receive and process wellbore data. By providing a communication assembly having this functionality, the present invention permits the transmission of well bore data and information, processed as desired, to one or more external systems or receivers without the need to transfer the data or information first to the surface acquisition system. In this manner, the present invention provides a more efficient, flexible and modular well site communication system. For example, a downhole sensor senses an increase in formation pressure and communicates this information to the surface as continuous analog data. The communication assembly 100 of the present invention, disposed on the reel 10 receives this analog information, compares to an action threshold programmed into the communication assembly, relays a signal to certain operator devices (such as PDAs) to communicate that the pressure action threshold has been exceeded while further relaying the analog information to the surface acquisition system for recording in the overall job record. Thus, the present system provides the functionality to receive, process, and communicate well bore data or information without the need to first pass the data or information through the surface acquisition system.

Figure 6:
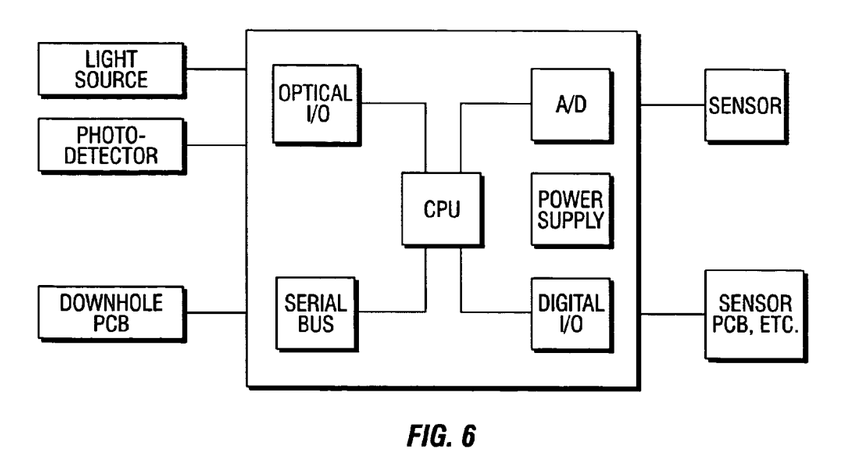
FIG. 6 shows an embodiment of functional layout of a downhole communication system for use in the present invention.
Figure 7:
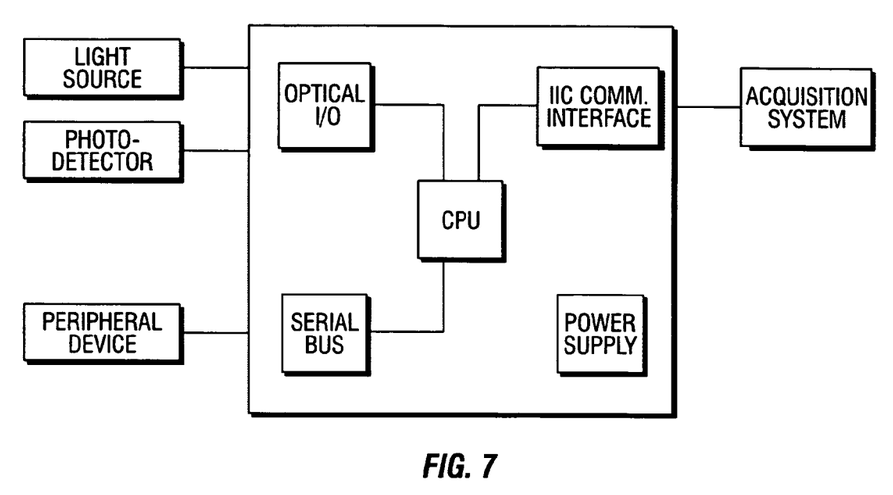
FIG. 7 shows an embodiment of functional layout of a surface communication system for use in the present invention.

FIG. 6 shows an embodiment of a downhole communication layout in which communication element 50 is fiber optics. In FIG. 6, it can be seen that different types of sensors (for example a fiber optic sensor, a digital sensor, or an electrical sensor) may be used to provide real time data to the communication system. The data from these various sensors may be provided to a downhole processing unit, or may be transmitted separately to the surface directly from the sensor. It is anticipated within the scope of the present invention that the output of the processor may be transmitted to the surface on a single or multiple fibers. It also is anticipated within the scope of the present invention that data from separate sensors may be transmitted on separate fibers or on multiple fibers. FIG. 7 shows one embodiment of a surface communication layout when communication element 50 is fiber optics. Optical input into the surface acquisition system is coupled with other data provided by peripheral devices that may input into the surface processing system via communication means such as a serial bus. From the processing unit, data is output to the injector control (IIC comm. interface) to control injector system 20 and the surface acquisition system.

Figure 8:
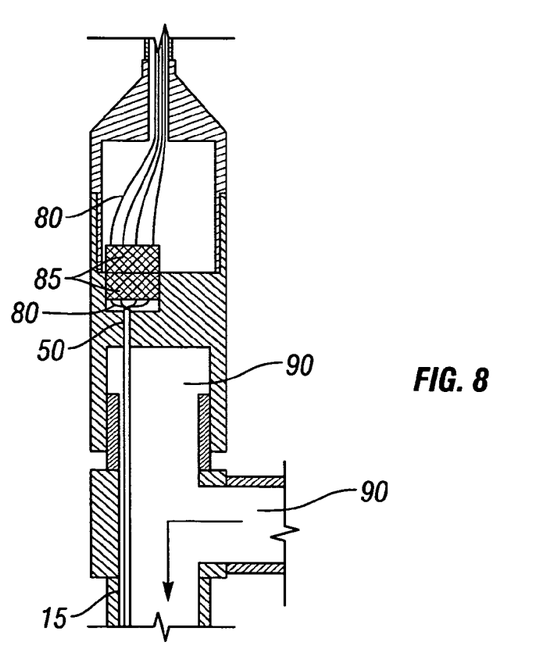
FIG. 8 shows an embodiment of a surface termination of the present invention.

In embodiments of the present invention wherein communication element 50 is one or more optical fibers disposed within coiled tubing, it is desired to terminate the optical fiber downhole and uphole in a manner that permits communication along the optical fiber and protects it from damage. FIG. 8 illustrates an embodiment of a fiber optic surface termination and FIG. 9 illustrates an embodiment a fiber optic downhole termination in the present invention.

Referring to FIG. 8, an embodiment of a surface termination is shown in which optical fibers 80 exit communication element 50 and to feed into pressure bulkhead 52. Although pressure bulkhead 52 will be required owing to wellbore pressure in most embodiments of the present invention, the communication system of the present invention is suitable for use without a pressure bulkhead when wellbore conditions permit. Mating blocks 85 may be used to provide transitions between portions of the present invention. In some embodiments, communication element 50 is disposed in coiled tubing 15, the coiled tubing being useful for providing fluid, such as treatment fluids, to a downhole environment. As shown in FIG. 8, a fluid connection, such as a T-joint or Y-joint, may be provided to permit treatment fluid 90 to flow or be pumped into coiled tubing 15.

Figure 9:
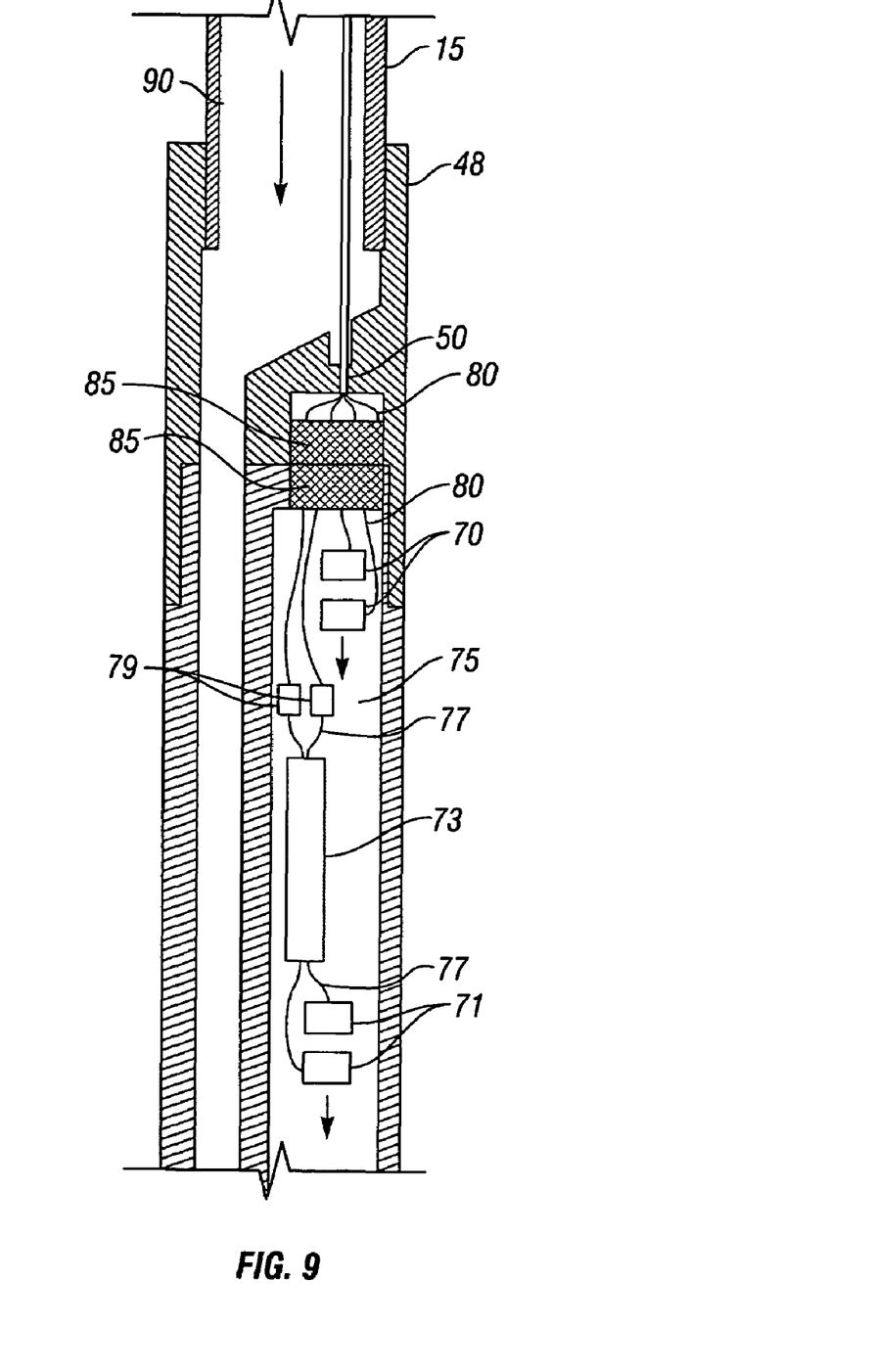
FIG. 9 illustrates an embodiment a fiber optic downhole termination of the present invention.

One embodiment of a downhole termination useful in the present invention is shown on FIG. 9. Referring to FIG. 9, sensors 70,71 are provided in sensor containment area 75. Sensor containment area 75 may be provided as a portion of a borehole or may be provided as a separate sensor assembly. While it is preferred to provide sensors 70,71 in a sensor containment area 75 when a treatment fluid 90 is being provided via the coiled tubing 15 in which the sensors and communication element 50 are disposed, it is also within the scope of the present invention to provide sensors 70,71 directly in the wellbore 8 when wellbore and operational conditions permit. Electrical sensors 71 are shown as connected to electrical lines 77. The outputs from these electric sensors are transmitted to a downhole processing unit 73 where it is converted from electrical or digital data to optical data and transmitted to optical source/receiver 79. From the optical source/receiver 79, or directly from downhole processing unit 73 in some embodiments, data are transmitted onto optical fibers 80 in communication element 50. Optical sensors 70 may be provide in lieu of, or in addition to, electrical or digital sensors. Optical sensors 70 may be connected directly to one or more fiber optic lines 80.

The present invention is useful in performing a variety of borehole operations. For example the wellbore acquisition system of the present invention may comprise fiber optic temperature and pressure sensors 70 and one or more electrical sensors 71 such as a geophone for sensing acoustic signals disposed in a wellbore, linked to the surface via a telemetry link such as a communication element 50 comprising fiber optics 80, the communication element 50 being disposed in coiled tubing 15. Wellbore conditions sensed fiber optic sensors 70 may be provided directly to the optical fiber or fibers 80 in the communication element 50. Data sensed by electrical sensors 71 may be converted to optical signals and then provided to the optical fiber or fibers 80 in communication element 50. Alternatively, when communication element 50 is wireline or slickline, sensed information from electrical sensors 71 may be directly provided to the communication element 50 while sensed information from fiber optical sensors 70 may be first converted to electrical or digital signals and then provided to communication element 50.

The data from the fiber optic sensors 70 and electrical sensors 71 is provided to the communication assembly 100 via communication element 50. Within communication assembly 100 the data is processed if desired, integrated with data or information from other sources if desired, and provided to wireless transmitter and receiver 40. Wireless transmitter and receiver 40 transmits the information to surface acquisition system 42 and wireless devices 54 using a wireless communication method such as BLUETOOTH protocol. Surface acquisition system records and monitors the received information and an operator may monitor the received information on a wireless device 54. In some embodiments, the operator has the wireless device, such as a cell phone or PDA, in his possession as he moves about the well site. In the event that the operator desires to send an operational control signal, or the surface acquisition system is programmed to send a prescribed operation control signal, to the wellbore acquisition system, the operator or surface acquisition system may wirelessly communicate that command to wireless transmitter and receiver 40 in communication assembly 100. The command is then transmitted from wireless transmitter and receiver 40 directly to the communication module 105 or to the interface module 108 for further transmission to the communication module 105. The communication module 105 transmits the command to communication assembly 50 which provide the telemetry link between the wellbore devices and the surface. The command travels via the telemetry link to the wellbore device, at which an operation, such as opening or closing a valve, increasing or decreasing the sampling rate, activating or deactivating a sensor, is preformed in response to the command. After the operation has been completed, the borehole device may send a confirmation signal via the telemetry link to the communication assembly 100 which wirelessly transmits the confirmation signal to the surface acquisition system 42 and to wireless devices 54. Using the apparatus and methods of the present invention, such downhole to uphole to downhole communication may be performed in real-time and without the physical configuration constraints required by known wired systems.

Operations that may be performed using the communication system of the present invention in coiled tubing operations include but are not limited to transmitting control signals from the surface equipment to the downhole equipment, transmitting information gathered from at least one downhole sensor to the surface equipment, or collecting information by measuring an borehole property. The downhole tools or sensors may include devices that manipulate or respond to a signal directly, e.g., temperature sensors or tools or sensors that produce an electrical signal in response to a measured property.

While BLUETOOTH is described herein as an example wireless protocol, it should be understood that other wireless communication protocols, such as cellular, wireless LAN or wireless protocols operating in a different frequency range, are contemplated within the scope of the present invention. Furthermore, wireless devices may communicate via other wireless devices or by other telemetry devices used in wells. Wireless devices may be incorporated into a downhole tool or device thereby providing the telemetry link of the downhole acquisition system wirelessly, such as described in co-assigned U.S. Ser. No. 10/086,023 published as U.S. Patent Application 2003/0098799, incorporated herein in its entirety. Those skilled in the art of wireless communication will appreciate that the principles of the invention described and claimed herein also apply any suitable wireless communication protocol and to wireless communications throughout the world.

It is to be understood that the invention is not limited to the exact details of construction, operation, exact materials or embodiments shown and described, as obvious modifications and equivalents will be apparent to one skilled in the art. All such modifications and equivalents are intended to be included within the scope of this invention as defined in the following claims. Accordingly, the invention is therefore to be limited only by the scope of the appended claims.

We claim:

1. A method of performing wellbore operations comprising
retrievably deploying a device downhole using a spooled conveyance disposed on a reel;
providing a telemetry link between the downhole device and the surface;
transmitting information from the downhole device to the surface using the telemetry link;
receiving the transmitted information in a communication assembly mounted on the reel, wherein the communication assembly rotates with the reel when deploying and retrieving the downhole device; and
wirelessly relaying the information from the communication assembly to a surface acquisition system.

2. The method of performing wellbore operations as claimed in claim 1 wherein the relaying is performed without the use of a surface collector.

3. The method of performing wellbore operations as claimed in claim 1 wherein the spooled conveyance is coiled tubing.

4. The method of performing wellbore operations as claimed in claim 3 wherein the telemetry link is disposed within the coiled tubing.

5. The method of performing wellbore operations as claimed in claim 1 wherein the spooled conveyance comprises the telemetry link.

6. The method of performing wellbore operations as claimed in claim 1 wherein the spooled conveyance is wireline.

7. The method of performing wellbore operations as claimed in claim 1 further comprising performing a well services operation while the downhole device is deployed in the wellbore 8. The method of performing wellbore operations as claimed in claim 7 wherein the well services operation comprises one of transmitting control signals from the surface acquisition system to the downhole equipment, transmitting information gathered from at least one downhole sensor to the surface acquisition system, and collecting information by measuring a borehole property.

9. The method of performing wellbore operations as claimed in claim 7 wherein the well services operation comprises introducing a treatment fluid into the wellbore.

10. A well site communication system comprising
a wellbore acquisition system including at least one borehole device attached to a spooled conveyance disposed on a reel, the reel being rotatable to spool or unspool the conveyance to convey or retrieve the spooled conveyance into the wellbore;
a surface acquisition system;
a communication assembly in operable communication with the wellbore acquisition system and the surface acquisition system to receive and process signals from at least one of the wellbore acquisition system and the surface acquisition system; and
a telemetry link between the borehole device and the communication assembly,
wherein the communication assembly is disposed on and rotates with the reel when the conveyance is deployed and retrieved.

11. The well site communication system of claim 10, wherein the at least one borehole device is attached to the spooled conveyance with a downhole termination allowing the passage of a treatment fluid thereby.

12. The well site communication system of claim 10 wherein the conveyance comprises the telemetry link.

13. The well site communication system of claim 10, wherein the conveyance is coiled tubing.

14. The well site communication system of claim 10, wherein the telemetry link is disposed within the coiled tubing.

15. The well site communication system of claim 10, wherein the telemetry link comprises optical fibers.

16. The well site communication system of claim 10, wherein the telemetry link comprises optical fibers disposed within a protective tube.

17. The well site communication system of claim 10, wherein the telemetry link is wireline.

18. The well site communication system of claim 10, wherein the communication assembly is operable to wirelessly communicate information from the wellbore acquisition system to the surface acquisition system.

19. The well site communication system of claim 10, wherein the communication assembly is operable to wirelessly receive information from the surface acquisition system and to relay the information to the wellbore acquisition system.

20. The well site communication system of claim 10, wherein the communication assembly is operable to wirelessly communicate data from the wellbore acquisition system to the surface acquisition system and to wirelessly receive data from the surface acquisition system and relay the information to the wellbore acquisition system.

21. The well site communication system of claim 10, wherein the surface acquisition system comprises at least one wireless device.

22. The well site communication system of claim 10, wherein the communication assembly communicates with surface acquisition system, the surface acquisition system comprising one or more wireless devices.

23. The well site communication system of claim 10, wherein the communication assembly communicates simultaneously with two or more wireless devices.

24. The well site communication system of claim 10, further comprising a power generation device disposed on the reel whereby power is provided to the communication system.

25. The well site communication system of claim 10 wherein the communication assembly communicates with the surface acquisition system without the use of a surface collector.

26. A method of communicating at a well site comprising
using a telemetry link to transmit information from at least one device disposed in a wellbore from downhole to the surface, wherein the telemetry link is disposed in a conveyance suited to be spooled on a reel, the reel being rotatable to spool or unspool the conveyance;
receiving and processing the transmitted information at a communication assembly;
communicating the received information from the communication assembly to a surface acquisition system, wherein the communication assembly is disposed on and rotates with the reel.

27. The method of communicating of claim 26, wherein the communication assembly communicates the received information to a surface acquisition system and at least one other device.

28. The method of communicating of claim 26, wherein the conveyance is coiled tubing.

29. The method of communicating of claim 28, wherein the telemetry link is disposed within the coiled tubing.

30. The method of communicating of claim 26, wherein the telemetry link comprises optical fibers.

31. The method of communicating of claim 26, wherein the conveyance and the telemetry link are wireline.

32. The method of communicating of claim 30, wherein the optical fibers are disposed within a protective tube.

33. The method of communicating of claim 26, wherein the step of received information comprises communicating wirelessly.

34. The method of communicating of claim 26, further comprising the step of performing a well bore operation in response to the received information.

35. The method of communicating of claim 26, wherein the communicating is performed wirelessly.

36. The method of communicating of claim 26, wherein the information is transmitted from the at least one device to the surface acquisition system in real time.

37. The method of communicating of claim 26, further comprising
transmitting information from the surface acquisition system to the communication assembly and
relaying the transmitted information from the communication assembly to the downhole device.

38. The method of communicating of claim 37, wherein the transmitting information from the surface acquisition system to the downhole devices is in response to the information transmitted from the downhole device to the surface acquisition system.

39. The method of communicating of claim 26, wherein the information from the surface acquisition system is transmitted wirelessly to the communication assembly.

40. The method of communicating of claim 26, wherein the communication assembly communicates with the surface acquisition system without the use of a surface collector.

41. The method of communicating of claim 34 wherein the well bore operation comprises one of transmitting control signals from the surface acquisition system to the downhole equipment, transmitting information gathered from at least one downhole sensor to the surface acquisition system, and collecting information by measuring a borehole property.

42. The method of communicating of claim 34 wherein the well bore operation comprises introducing a treatment fluid into the wellbore.

* * * * *